E. S. LUCAS.
MOTOR DRIVEN TRACTOR CULTIVATOR.
APPLICATION FILED APR. 16, 1919.

1,353,923.

Patented Sept. 28, 1920.
4 SHEETS—SHEET 4.

Inventor
Earl S Lucas

By Watson E. Coleman
Attorney

UNITED STATES PATENT OFFICE.

EARL S. LUCAS, OF RANDOLPH, IOWA.

MOTOR-DRIVEN TRACTOR-CULTIVATOR.

1,353,923.  Specification of Letters Patent.  Patented Sept. 28, 1920.

Application filed April 16, 1919. Serial No. 290,454.

*To all whom it may concern:*

Be it known that I, EARL S. LUCAS, a citizen of the United States, residing at Randolph, in the county of Fremont and State of Iowa, have invented certain new and useful Improvements in Motor-Driven Tractor-Cultivators, of which the following is a specification, reference being had to the accompanying drawings.

This invention relates to an improved motor driven cultivator or lister, or plow apparatus, and the invention aims to provide an apparatus of this kind, which, at one time, may be employed to list several rows, and at other periods plow several other rows, in order to cultivate the ground between the rows of a corn crop. Obviously it is the intention to provide a machine, aiming especially to eliminate the use of horses.

The invention further aims to provide a plurality of listers, equally spaced, say for instance about three feet, six inches apart, and operating to be controlled in the rear of each set of supporting traction wheels, there being plows or shovels, adapted for use in cultivating soil between the rows of corn.

The invention further aims to provide means for raising and lowering plows or shovels, as well as the listers, whereby they may be moved in or out of engagement with the soil, as the case may be.

The invention further aims to afford the employment of harrow disks and shovels in lieu of the listers, means being provided whereby the disks may be moved in engagement with the soil, so that the shovels may be put in use, or to use the disks and the shovels, the shovels to operate directly in the rear of the disks. When using the shovels the center of the soil between the rows of corn may be thoroughly cultivated. At certain times with the use of this machine it is possible to plow the soil, when running the wheels astride the rows of corn, it further being possible to plow or cultivate the soil between two rows at a time, and at such time when the machine is being so operated a row of corn is passed on each side of the front wheels. When using the plows, it is the aim to provide a plurality of shovels to each plow, there being means provided to shift the shovels or plows slightly in lateral directions, so that they may be kept in the ground between the rows of corn, in case the wheels do not travel exactly between the rows.

The invention further aims to provide improved supporting traction wheels, which may be substantially bell-shaped, and may be of any suitable diameters, and provided with suitable hubs having means whereby the wheels may be fastened adjustably to their shafts, whereby they may be adjusted toward and from each other. In other words these wheels are shaped to somewhat resemble a conventional form of telephone bell, in further words, cupped. The aim in providing wheels of this character, is to permit them to travel on each side of a row of corn, it having been found that when once the supporting traction wheels engage the ditch, they will remain in such engagement, until the machine or apparatus reaches the end of the row. Close observation has disclosed the fact that wheels of this character will hang closely to the side of the bank of the ditch, rendering it substantially impossible for them to become displaced from the bottom of the ditch.

The invention further aims to provide means for detachably connecting these wheels to their axles, and in such wise as to enable them to be interchanged. In other words, when the wheels are used with their annular flanges extending toward each other, the outer surfaces of the wheels will remain in firm engagement with the bank of the ditch. Should one wheel be detached and substituted in the position of the other wheel, which is substituted in the place of the first wheel, the wheels will travel on the ridge of the ditch. This use of the wheels is employed, when the machine is used as a lister, and in this case the listers will travel or operate directly in the rear of the wheels.

The invention further aims to enable the supporting traction wheels, in order to pull a load, by adjusting the wheels so that the flanges will abut. there being the usual diagonal ribs on the exterior surfaces of the flanges of the wheels so that they will pull on the soil without slipping.

The invention further aims to provide means for carrying the diagonal ribs, and adapted to be connected and made removable from the wheels, so that the diagonal ribs may be used at one time or dispensed with at another time, and vice versa.

The invention further aims to provide means for supporting the axles of the wheels, so that they will freely operate, such means including ball bearings.

A further object of the invention is to provide improved means, whereby the front supporting wheels (which are of the same design as those at the rear) may be turned for the purpose of steering to the right or left. These wheels are also adjustable on their axle, which is mounted in suitable ball bearings.

The invention further aims to provide an improved front wheel supporting frame provided with an improved swivel connection, including a turn-table principle, to the main frame of the apparatus, whereby the supporting frame of the front wheels may freely and easily turn.

The invention further aims to provide operative connections between the driving mechanism and the rear wheels.

While the present design and construction as now illustrated and set forth is deemed preferable, it is obvious that the invention is susceptible to changes, when reducing the invention to a practical form for commercial purposes. The right to these changes is claimed, provided they are comprehended within the scope of what is claimed.

The invention comprises further features and combination of parts, as hereinafter set forth, shown in the drawings, and claimed.

Figure 1:
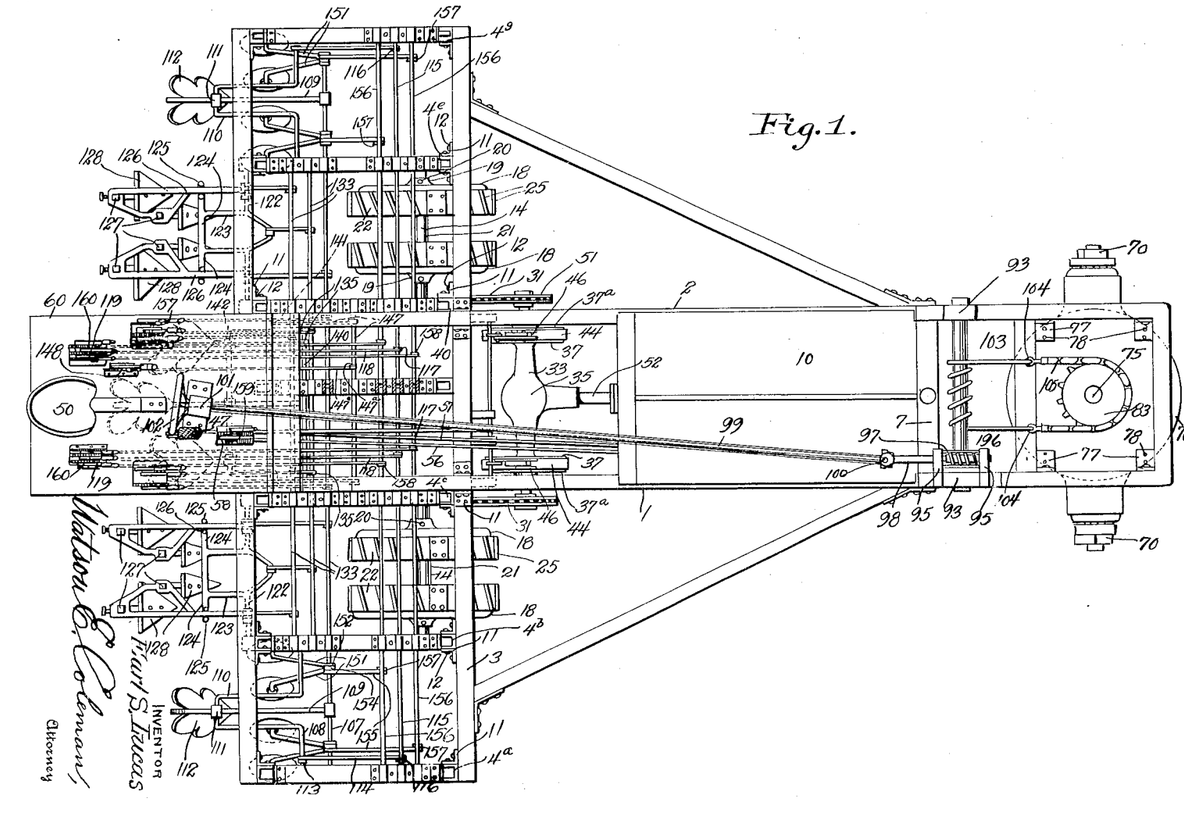
Figure 1 is a plan view of the improved motor driven cultivator apparatus, constructed in accordance with the invention.
Figures 2, 3, 4:
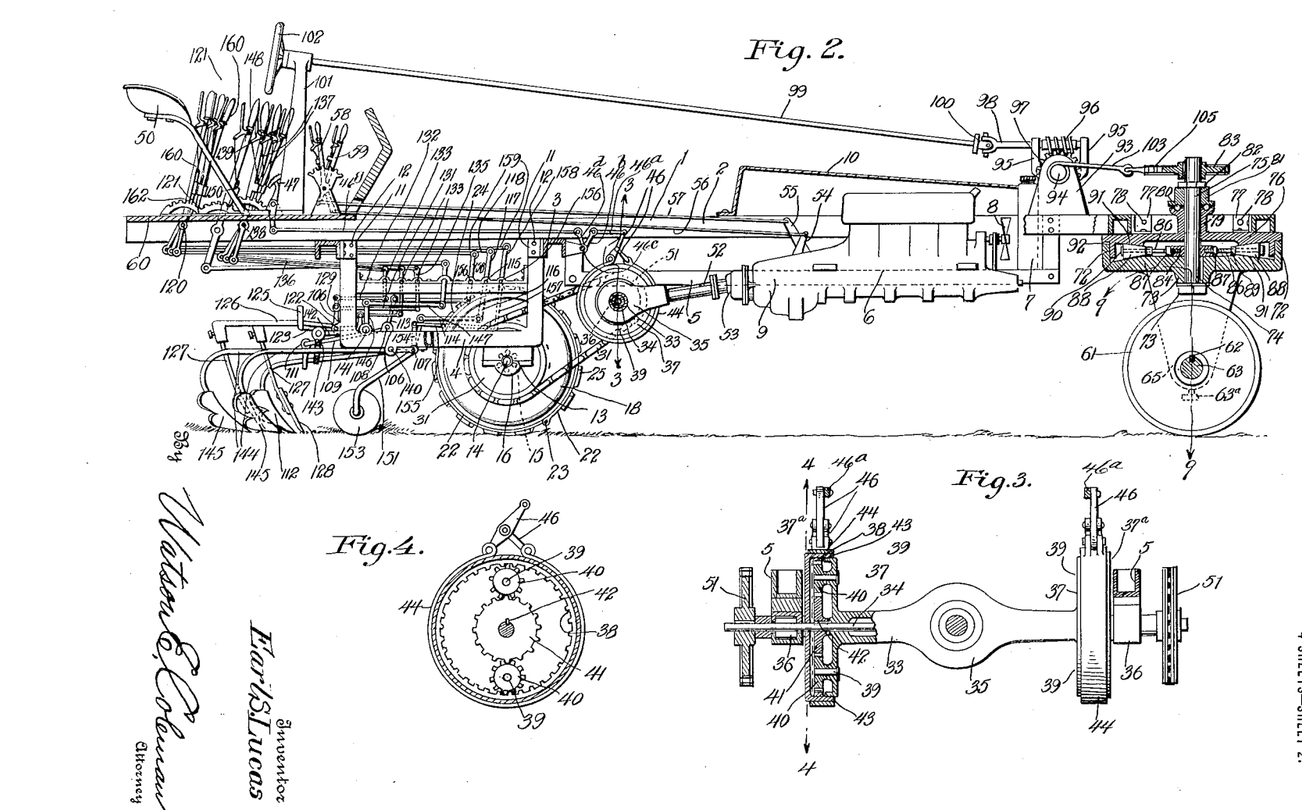
Fig. 2 is a longitudinal sectional view on line 2—2 of Fig. 1, illustrating the connections of the front wheels with the main frame, the driving mechanism, the cultivating disks, the shovels and the plows.
Fig. 3 is a transverse sectional view on line 3—3 of Fig. 2.
Fig. 4 is an enlarged detail sectional view on line 4—4 of Fig. 3 of one rear side end of the frame of the machine, showing the disks raised, and the shovels in an operative position.
Figure 5:
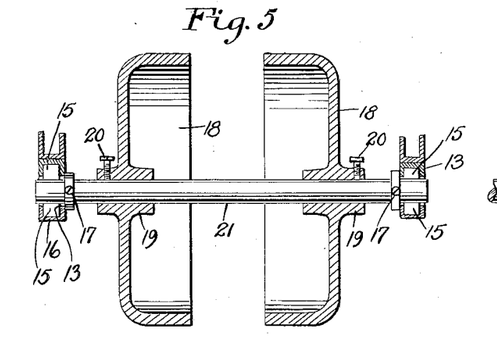
Fig. 5 is a detail sectional view through a pair of the rear supporting wheels, showing them spaced on their driven shaft.
Figure 6:
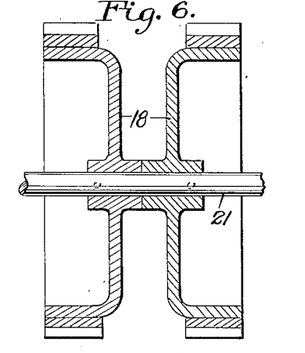
Fig. 6 is a view showing the supporting wheel shown in Fig. 5 as being transposed, and showing the traction members clamped on the wheels.
Figure 7:
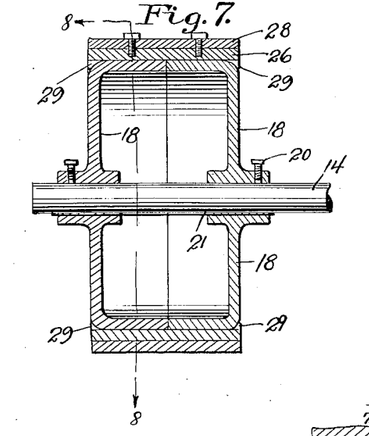
Fig. 7 is a view of the supporting wheels shown in Fig. 5, showing their marginal edges brought together and in contact, illustrating traction means clamped thereon.
Figure 8:
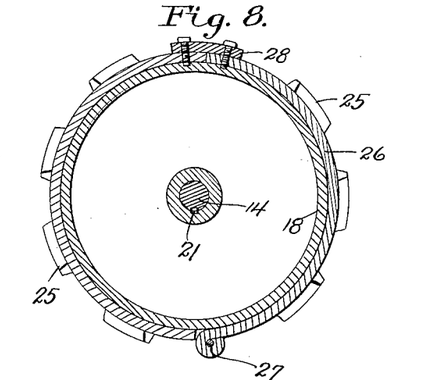
Fig. 8 is a sectional view on line 8—8 of Fig. 7.

Referring more especially to the drawings 1 designates a frame of a machine as a whole. It is to be observed that this frame comprises an elongated main portion 2, its length extending in a plane parallel with the travel of the machine, and an auxiliary transversely disposed portion 3, which is arranged at the rear of the main portion. The auxiliary portion is provided with downwardly depending U-shaped supports 4. The main portion 2 of the frame is supplied with a second auxiliary depending frame structure 5, which supports a four-cylinder internal combustion engine 6, which may be of any general or conventional construction, it being provided with the usual radiator 7, the usual fan 8, and a conventional form of transmission gear mechanism 9. In order to obscure the driving mechanism, a suitable hood 10 is carried by the main frame, as clearly illustrated. The entire frame in the present instance is constructed of suitable channel iron beams, and where the beams adjoin, they are suitably braced and bolted, by the reinforcement plates and bolts 11 and 12. The portion 2 of the frame is provided with rearwardly diverging channel beams, which act to reinforce the transverse portion of the frame relative to the main portion 2.

Mounted in suitable bearings 13 of the depending U-shaped frame parts or supports 4 is a rear axle 14. The bearings 13 are provided with anti-frictional roller bearings 15, a suitable boxing 16 being so constructed for the reception of the ball bearings, allowing the axle 14 to revolve very freely, there being means in connection with the boxing, as indicated at 17, to prevent axial movement of the axle.

Mounted upon each axle 14 is a pair of supporting traction wheels 18. These traction wheels 18 are of a design or construction resembling the contour of a bell, of that type particularly used on telephones. In other words, these wheels are cupped, consequently provided with annular flanges, to engage the ground or soil. The wheels are supplied with hubs 19, which receive suitable set bolts or the like 20, adapted to be set up to frictionally bind on the axle, in order to keep the wheel firmly on the axle, so as to rotate therewith. Other means may be provided, such as splining or feathering wheels on the axle, as shown at 21. However, even in this case a set bolt is necessary, to prevent relative axial movement on the axle. At certain times these supporting traction wheels ride or engage in the ditch, the outer walls of the wheels, (where the walls merge into the annular flanges) will ride and maintain themselves in contact with the bank or the wall of the ditch. This construction of wheel renders it practically impossible for the wheel to become displaced from the ditch, consequently keeps the machine true to the desired travel. It is obvious that these supporting wheels may be transposed, in other words, positioned so that the flanges will extend outwardly instead of toward each other, and in such a case, the flanges of the wheels will ride upon the ridge of the ditch, and this action of the wheel is of a particular advantage when using the listers. Further, it is obvious that the wheels may be adjusted on the axle, so that the flanges of the wheels may abut, thereby affording a supporting wheel having a tread surface of a considerable wide area. When the wheels are so used, it is essential that tracting means should be employed. The type of tracting means in the present instance comprises semi-circular bands 22, two for each wheel in some instance, hingedly united as at 23, and adapted to encircle the flanges of the wheels proper. The other ends of the semi-circular bands or sections are provided with suitable fastening sections, such as the bolted plates 24, to fasten the sections on the rim or flange of the wheel. These semi-circular sections have diagonally arranged ribs 25, to engage the soil or ground, thereby preventing lateral slipping. In other instances when the wheels of each pair are brought together so that their rims may abut, a single auxiliary tracting rim may be employed. This rim 26 in such an instance consists of two sections hingedly united at 27, and are adapted to encircle the rims of both of the wheels. These sections at their other ends are connected by a suitably bolted plate 28. In this case, instead of using the bolts of the bolted securing plate to prevent axial movement of the auxiliary rims, lugs 29 are supplied, on the outer edges of the auxiliary rims, and which are adapted to overlie the outer walls of the wheels, to prevent displacement.

Also keyed to the axles 14 as shown at 30, are driven sprockets 31, with which the driving sprocket chains 31ª engage, it being obvious that revoluble movement is imparted to the axle and the wheels.

Arranged between the sides 32 of the depending frame part 5 of the frame portion 2 is an axle casing 33, for the reception of the drive axle 34. This axle casing 33 at a point midway its ends is provided with the usual differential casing 35, in which the differential gear mechanism (not shown) is carried. It is obvious that this differential gear mechanism may be of a conventional character, and consequently forms no part of the present invention. Each outer end of the axle 34 (which consequently consists of two sections, and which are driven by a differential mechanism) is mounted in a roller bearing 36. Each outer end of the axle casing 33 terminates in a gear casing 37. A casing section 37ª coöperates with the casing 37, and on the interior surface of the flange of which teeth 38 are formed. Mounted upon stub shafts 39 projecting laterally from one of the walls of the gear casing 37 are gears 40, which mesh with a gear 41 at diametrically opposite points, and which gear 41 is keyed as shown at 42 to the end portion of the axle 34. The casing section 37ª has a swivel connection as at 43 with the gear casing, and this casing section constitutes a brake drum, with which the brake band 44 coöperates, for retarding the machine. The brake bands have connected thereto the actuating members 46, certain of which are connected by rods 46ª to the arms 46ᵇ of the shaft 46ᶜ, which is mounted in bearings of the frame. This shaft has an additional arm 46ᵈ, to which a rod 46ᵉ is connected. This rod is in turn connected to the foot lever 47 of the platform at the rear of the machine. Obviously by the actuation of the foot lever, both brakes are actuated simultaneously. The foot lever is located in close position to the operator's seat 50, which is supported on the rear end of the frame. Carried by the axle 34 adjacent its outer ends, are sprockets 51, about which the sprocket chains 31ª engage. The central drive shaft casing 52, which has the conventional form of universal joint connection 53 with the transmission casing 9, is connected to the differential casing 35. This casing 52 contains the usual central drive shaft, (not shown) but which is in gear connection with the differential mechanism. Since the power is transmitted to the driving axle 34 from the motor or engine through the medium of the central drive shaft it is obvious that power is also transmitted from the sprockets 52 to the axles 14, imparting motion to the supporting traction wheels.

The transmission mechanism designed to be of the three-speed type and reversed, and the levers 54 and 55 thereof have connected thereto the rods 56 and 57, which in turn are connected to the levers 58 and 59, which are carried upon the rear platform 60 of the frame of the machine. These levers 58 and 59 are in close position to the operator's seat, whereby he may have easy control thereof.

Figure 9:
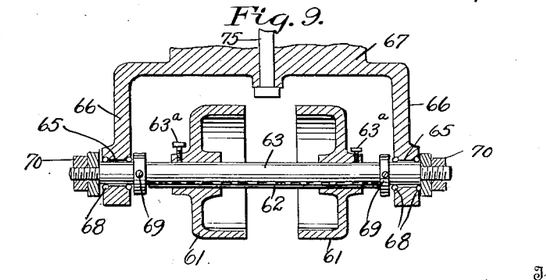
Fig. 9 is a sectional view on line 9—9 of Fig. 2.

Front supporting wheels 61 are provided, and which are similar in construction to the rear wheels, and are splined or feathered at 62 upon the front axle 63, there being set bolts 63ª for holding the wheels in different adjusted positions on the axle. This axle 63 is mounted in bearings 65 of the lower ends of the depending sides 66 of a turn-table frame 67. The bearings 65 include anti-frictional balls or members 68. Collars 69 are detachably fastened to the axle 63, and engage the inner faces of the arms 66, to prevent axial movement of the axle, there being suitable nuts 70 on the outer ends of the axle to also prevent axial movement of the axle. This turn-table frame has an annular flange 72, and provided with a concentric depending hub 73, and through the medium of the feather or spline 74 the turn-table frame is keyed to a vertical steering shaft 75. A turn-table section 76 is fastened to the forward end of the portion 2 of the main frame, by means of the plates 77, which are bolted in place as at 78. The turn-table section has a bearing hub 79, through which the vertical shaft 75 rotatably extends. Anti-frictional members 80 are interposed between the upper end of the bearing hub and the plate 81, which is threaded upon the shaft, there being a lock nut 82 to hold the plate 81 in position. The upper end of the vertical shaft 75 carries a sprocket 83. Interposed between the turn-table frame and the turn-table section and surrounding the shaft 75 is a collar 84, provided with radial arms 86. These arms are threaded into the collar, and prevented from displacement by the lock nuts 87. The outer ends of the arms carry cone roller bearings 88, between the collars 89 and the heads 90 of the arms. The adjacent faces of the turn-table frame and the turn-table section are provided with diverging roller bearing engaging faces 91, between which the roller bearings coöperate, thereby reducing the friction between the turn-table frame and the turn-table section to a minimum. In order to maintain concentricity between the turn-table frame and the turn-table section, the flange 72 of the turn-table frame telescopes the depending flange 92 of the turn-table section. Rising upwardly from the portion 2 of the frame are bearings 93, in which the shaft 94 is mounted. One of the bearings 93 have laterally extending bearing arms 95 for the reception of the steering rod, which carries a worm 96, which meshes with the worm wheel 97, which is carried by and rotatable with the shaft 94. The steering rod comprises two sections 98 and 99 which are united by the universal joint 100. The section 98 carries the worm 96, while the rear end of the section 99 is mounted in a bearing 101, which rises upwardly from the platform 60 of the frame of the machine. The rear extremity of the section 99 of the steering rod carries a conventional form of steering wheel 102. A cable 103 is wound several times about the shaft 94. The opposite ends of the cable 103 are connected at 104 to the sprocket chain 105, which engages about the sprocket 83. It is obvious that when motion is imparted to the steering rod by the manipulation of the steering wheel 102, the worm operates the worm wheel, and imparts motion to the shaft 94, which motion is transferred to the vertical shaft 75. Since the turn-table frame is keyed to the vertical shaft 75, it is obvious that an oscillatory movement in a horizontal direction is imparted to the turn-table frame, whereby the machine may be easily controlled to travel either to the right or the left.

Figure 12:
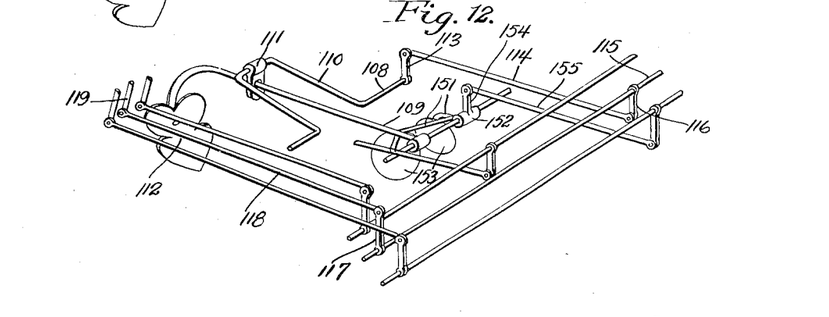
Fig. 12 is an enlarged detail perspective view of the means for operating or handling the listers 112 and the disks 153.

The transverse portion 3 of the frame is provided with a plurality of depending U-shaped frame parts or supports 4, say for instance six in number designated respectively 4ª, 4ᵇ, 4ᶜ, 4ᵈ, 4ᵉ, and 4ᵍ. The lower portions of these frame parts or supports 4 have bearings 106. Mounted in the bearings 106 of the frame parts or supports 4 at the extreme opposite side ends of the portion 3 of the frame, are shafts 107 and 108. Pivotally mounted upon the shafts 107 are beams 109. The shafts 108 have U-shaped parts 110, which carry pivotally mounted bearings 111, through the depending portion of which the beam 109 movably extends. The rear part of the beam 109 curves downwardly and constitutes a standard for the support of a lister 112. One end of the shaft 108 has an upstanding arm 113, to which a rod 114 is connected. Mounted in bearings of cross pieces of the U-shaped parts at the rear part of the frame of the machine are shafts 115, their outer ends are provided with downwardly depending arms 116, to the lower ends of which the rods 114 are connected. The inner ends of the shafts 115 have upstanding arms 117, to which the rods 118 are connected. These rods 118 are in turn connected to manually manipulated levers 119 which are pivoted at 120 on the platform at the rear of the machine. These levers are provided with the usual handgrip controlled dog and ratchet mechanism 121, for holding the levers in different adjusted positions. Obviously by moving the levers individually, the shafts 115 may be rocked which, through their connections to the shafts 108, the shafts 108 will be rocked in their bearings, and consequently raise the beams 109, for raising or lowering the listers or plows 112. One or both of the plows may be tilted or raised, as the case may require.

Figure 10:
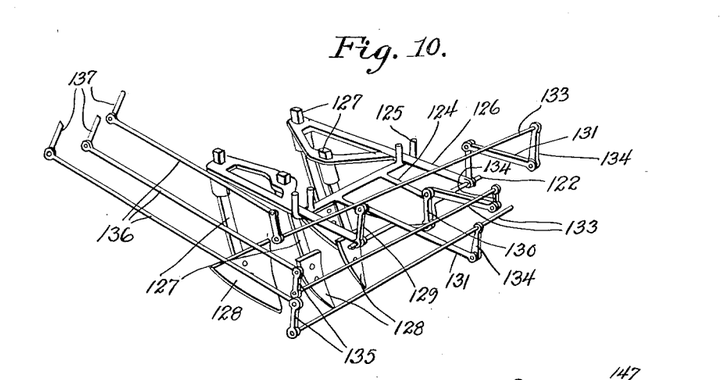
Fig. 10 is a perspective view of the means for operating the shovels 128.

Mounted in the bearings 106 of the frame parts or supports 4, 4ᵇ, and 4ᶜ are shafts 122, which are provided with loops 123, and extending laterally from the loops are arms 124 provided with upstanding U-shaped parts 125. Beams 126 are pivoted upon the shafts 122, and rest in the upstanding U-shaped parts 125. These beams are arranged in pairs, one pair on each side of the center of the rear part of the frame. The beam of each pair is provided with a lateral portion, and carried by the beam and the lateral portion are the standards 127, the lower ends of which have shovels 128. The pivoted ends of the beams 126 have upstanding arms 129, and the rear part of the loop 123 has an upstanding arm 130. Rods 131 are connected to the arms 129 and an additional rod 132 is connected to the upstanding arm 130. A plurality of rock shafts 133 are mounted in bearings of the platform at the rear part of the frame of the machine. These shafts have their outer ends provided with downwardly depending arms 134, to the lower ends of which the rods 131 are connected, while to the lower end of the third arm 134, which is centrally disposed, the rod 132 is connected. The inner ends of the shafts 133 have upstanding arms 135, to which the rods 136 are connected, which in turn are connected to the manually controlled levers 137, which are pivoted at 138 on the platform at the rear of the machine. These levers carry the conventional form of handgrip controlled dog and ratchet mechanism 139. It may be observed that by operating the mechanism 139, the beams carrying the shovels can be tilted vertically. Obviously by tilting the center levers 139 of each series, the shovels on each side of the center of the frame may be tilted simultaneously, and by operating one or the other of the end levers 139, one set of shovels may be tilted independently of the other set, that is to say, of each series on each side of the center of the machine.

Figure 11:
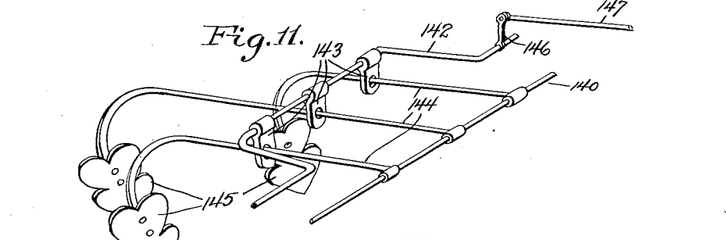
Fig. 11 is a perspective view of the means for operating and handling the listers 145.

Mounted in bearings of the depending frame parts or supports 4°, and 4ᵈ are shafts 140 and 141. The shaft 141 has a loop portion 142, carrying pivoted guide bearings 143. A plurality of beams 144 are pivoted upon the shaft 140, and slidably engage through the depending parts of the bearings 143, and carry on their downwardly curved standards listers 145. One end of the shaft 141 has an upstanding arm 146, to which a rod 147 is connected. The rod 147 is connected to a depending arm of the shaft 147ᵃ, which is provided with an upstanding arm 147ᵇ. To the arm 147ᵇ a rod 147ᶜ is connected, as shown in Fig. 1. This rod is in turn connected to a lever 148 which is pivoted at 149 to the platform at the rear of the machine. This lever 148 carries the usual handgrip controlled dog and ratchet mechanism 150 for holding the lever 148 in different adjusted positions. Obviously by adjusting the lever 148 the rock shaft 141 may be rocked in its bearings which will tilt the beams 144 vertically, therefore raise and lower the listers.

Also mounted upon the shafts 107 and movable therewith are collars provided with depending diverging arms 151, on the lower lateral extremities of which harrow disks 153 are rotatably mounted. Rising upwardly from the collars 152 are arms 154, to which the rods 155 are connected. Mounted in bearings on the U parts at the rear of the machine are shafts 156, the outer ends of which have depending arms 157 to which the rods 155 are connected. The inner adjacent end of the shafts 156 have upstanding arms 158, to which the rods 159 are connected. These rods 159 are in turn connected to the levers 160, which are pivoted at 120 and are provided with handgrip controlled dog and ratchet mechanism 162, for holding the levers in different positions. By adjusting the levers 160, the shafts 156 may be rocked in their bearings and consequently the disks are tilted. It is obvious that these disks may be duplicated on the shafts 122 and 140, if so desired.

While there is shown ball bearings for the axle 63, it is obvious that roller bearings may be employed in their stead, equally as advantageous. It is to be noted that any conventional form of differential mechanism may be employed in connection with the machine as disclosed in this application.

While this machine is illustrated as having the shovels 128, the listers 145, and the disks 153, all mounted upon the frame of the machine, including a plurality of levers, about fifteen in all, for controlling and manipulating the shovels, listers and disks, it is obvious that the number of levers may be reduced, and only certain of the ground manipulating elements employed, without departing from the spirit of the invention. For instance, it is the design of the invention to first use three listers, which are positioned and operable to the rear of the three sets of wheels, one set behind each of the rear wheels, and a central set at the rear of the machine, but directly rearwardly of the front wheels, in order to list the soil, whereby the corn can be planted. When listing the soil in this manner it is the aim of the present invention to employ a planter attachment (not shown), but for use in connection with each set of listers, so that it may be possible to plant corn as the soil is listed. It is obvious when using three sets of listers in this manner, that it is only necessary to employ three levers, each for the manipulation of the listers, so that they may be easily manipulated and controlled, according to the desired listing of the soil. After the soil has been listed and the corn planted, it is to be understood that the listers may then be detached and in their stead the disks and the small shovels 112 may be arranged and employed, the shovels following the disks. Then for a second plowing, it is the aim to reverse the disks, and set the shovels out to the center of the ridge, to level the soil or ground. In other words, the disks and the small shovels are designed for cultivating the soil, after listing and planting. Then for a last or laying by corn, as it is termed in certain parts of the country, it is the design of the invention to utilize two sets of cultivators, four shovels each, such as 128, and these cultivators are designed to operate on each side of the front wheels to the rear, and to cultivate the soil. When these shovels or cultivators 128 are employed the disks and shovels are removed, that is the shovels or cultivators 128 are substituted for the disks and shovels 153 and 112. When employing the cultivators 128 it is the aim of the invention to also utilize fenders (not shown) in connection with the cultivators or shovels, to keep from covering up the corn. When desired, it has been found most convenient, and very essential to employ a pair of disk harrows or pulverizers (not shown) to be drawn by the machine herein illustrated at its rear, the disk harrows or pulverizers acting to pulverize the soil before planting. Many uses may be made of the machine or apparatus, such as set forth in this application. For instance, it may be employed for scraping or dragging roadbeds, drags or scrapers (not shown) to be substituted for the members 128, 145 and 153. When the cultivators or shovels 128 are employed to the rear, but to one side of the front wheels, it is the aim of the invention to adjust the supporting wheels of the rear of the frame as far to one side as possible, and in the actual manufactured machine, it is the aim to construct the rear part of the frame sufficiently long enough transversely, and to permit the supporting wheels to be adjusted as far to one side in opposite directions as possible, whereby such front wheels will not operate in front of the cultivators or shovels 128.

While these changes and substitutions have been herein indicated and while they are clearly obvious, the apparatus has been illustrated in the drawing, to show the various cultivators or shovels 128, and listers 145, and the disks 153, and their shovels 112, all mounted on the frame at the rear, including the necessary shovels, and the requisite number of levers for controlling them. It is obvious that these levers as illustrated may be manipulated or handled, so that the various cultivators or shovels 128, the listers 145, the disks 153 and the shovels 112 may be handled or manipulated, to attain the same result, as may be accomplished by the detaching of certain of these parts and substituting others, and vice versa.

The invention having been set forth, what is claimed as new and useful is:

1. In a machine as set forth, a frame provided with bearings, a driving shaft comprising axially alined sections mounted in said bearings, additional depending bearings on the frame in advance of the first bearings, differentially united axially alined driven shaft sections mounted in the last mentioned bearings, a casing housing said differentially united shaft sections and terminating at its opposite ends in stationary brake drum heads, rotatably movable brake drum heads adjacent the first heads and having operative gear connections with the differentially united shaft sections, gear means operatively connecting the outer ends of the differentially united shaft sections and the first shaft sections for transmitting power to the latter, means coöperating with the rotatably movable brake drum heads whereby through the medium of the movable brake drum head, the differentially united shaft sections and the gear means will act to control the first driving shaft sections, and supporting traction drive wheels on the first shaft sections.

2. In a tractor as set forth, a dominant frame, an auxiliary frame connected to and extending transversely of the dominant frame adjacent the rear thereof, said auxiliary frame having depending bearings on each side of the dominant frame, axially alined shafts mounted in said bearings, the dominant frame having depending supports positioned in a plane in advance of the bearings, driven shaft sections mounted in bearings of the supports, means operatively connecting the shaft sections and the first shaft for driving the same, supporting wheels for the forward end of the dominant frame and traction wheels mounted on the first axially alined shafts.

3. In a tractor as set forth, a dominant frame, an auxiliary frame fixed relatively to the dominant frame and extending transversely thereof adjacent the rear, said auxiliary frame having depending bearings disposed in positions on opposite sides of the dominant frame, the auxiliary frame carrying soil working implements at the rear axially alined shafts mounted in said depending bearings, driving means therefor, the forward end of the dominant frame having supporting wheels, and traction wheels mounted on the shaft sections and being adjustable thereon laterally relatively to the soil working implements and the front supporting wheels.

4. In a tractor, a dominant elongated auxiliary frame being relatively fixed to the dominant frame and disposed transversely thereof adjacent the rear, the end portions of the auxiliary frame extending laterally of the dominant frame and provided with depending bearings, axially alined shafts mounted on said bearings and being operable in positions offset from opposite sides of the dominant frame, driving means for said shafts, supporting wheels for the forward ends of the dominant frame, and traction wheels on the axially alined shafts and being adjustable laterally relatively to the forward supporting wheels.

In testimony whereof I hereunto affix my signature in the presence of two witnesses.

EARL S. LUCAS.

Witnesses:
BERT E. RICHARDSON,
E. S. LUCAS.